Oct. 4, 1938.    H. P. SCHRANK    2,132,324
METHOD OF AND APPARATUS FOR REMOVING BANDS FROM BUILDING DRUMS
Filed Oct. 26, 1935    2 Sheets-Sheet 2

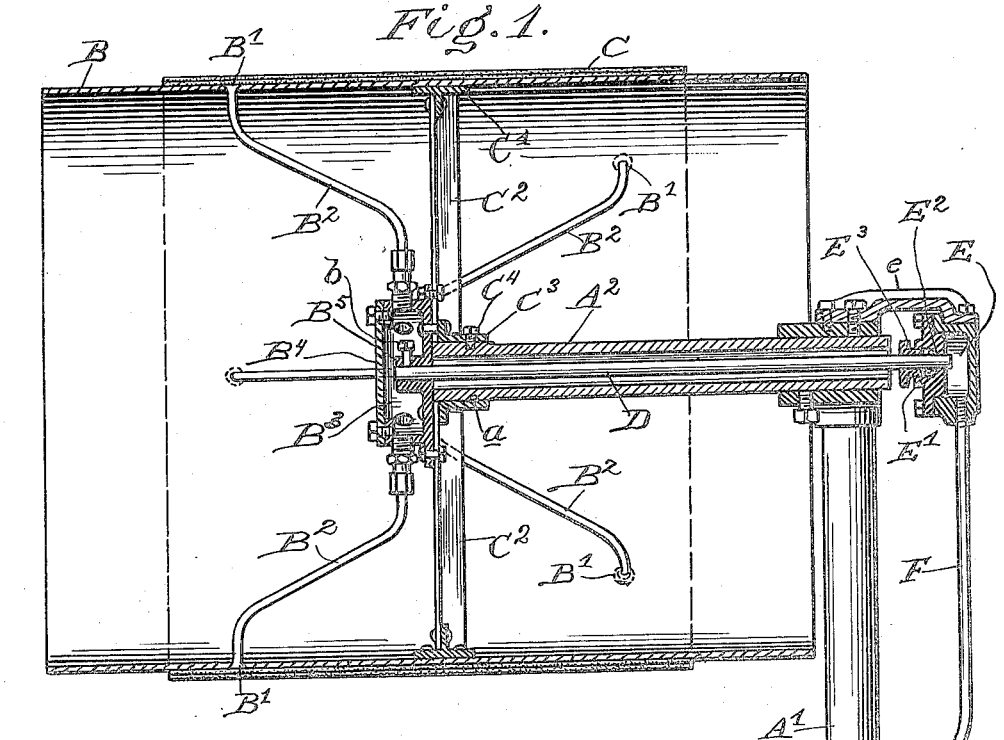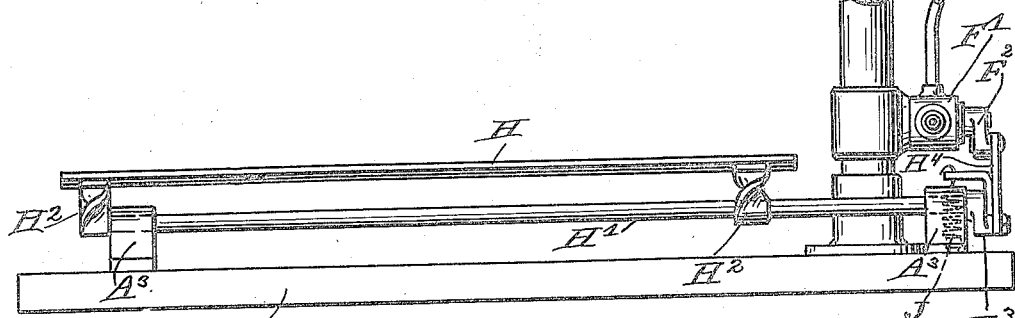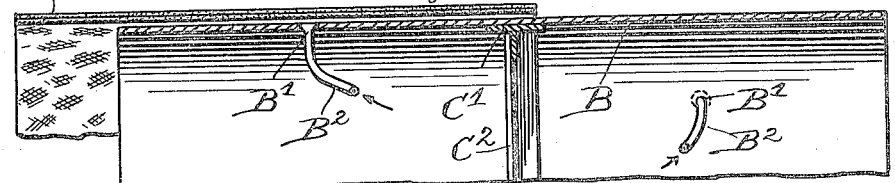

INVENTOR
Harry P. Schrank
BY Morrison, Kennedy & Campbell
ATTORNEYS

Patented Oct. 4, 1938

2,132,324

UNITED STATES PATENT OFFICE 2,132,324

METHOD OF AND APPARATUS FOR REMOVING BANDS FROM BUILDING DRUMS

Harry P. Schrank, Akron, Ohio, assignor to Seiberling Rubber Company, a corporation of Delaware Application October 26, 1935, Serial No. 46,854

12 Claims. (Cl. 154—14)

This invention relates to the art of building pneumatic tires, and more particularly to a method and apparatus for removing bands, such as are incorporated in the tires and the building whereof constitutes one of the early steps in tire fabrication, from the drum on which they are formed.

In the construction of a pneumatic tire, it is the usual practice, first, to form a band from the gum coated cord fabric, usually two plies in thickness, by wrapping strips of material (obtained either from a stock roll or from a bias cutter) around a cylindrical drum, and then splicing the ends together. Thereafter, the band is removed longitudinally from the drum for use in the next phase of the tire building process. Due to the fact that the strips are gum coated and also that they are wrapped tightly around the band building drum (although not unduly stretched) they adhere to the drum and for this reason are rather difficult to remove.

According to the instant invention, the adhesion between the drum and the band is broken by forcing air between the band and the drum, thus creating a thin film of air between the contacting surfaces which greatly facilitates the removal of the band.

A band building machine equipped with the present improvements includes a drum rotatably mounted on a standard in much the same manner as in the case of the drums heretofore used, but the surface of the drum is formed with a plurality of holes or openings located in that region of the drum surface with which the band will be in contact when on the drum. Means are provided for forcing air through the openings just alluded to and between the band and the drum surface. When this occurs, which will be at the will of the operator after the construction of the band has been completed, the adhesion between the band and drum will be broken, and all friction between the two substantially eliminated, thus permitting the band to be slid endwise off the drum with minimum effort on the part of the operator.

Other features of the invention are directed to the means for connecting the openings in the drum surface with a suitable source of compressed air.

Referring to the drawings:

Fig. 1 is a vertical longitudinal sectional view through a machine equipped with the present improvements and with which the improved method can be practiced;

Fig. 5 is a sectional view through a portion of the band and drum, illustrating the manner in which the band is removed.

Figure 2:
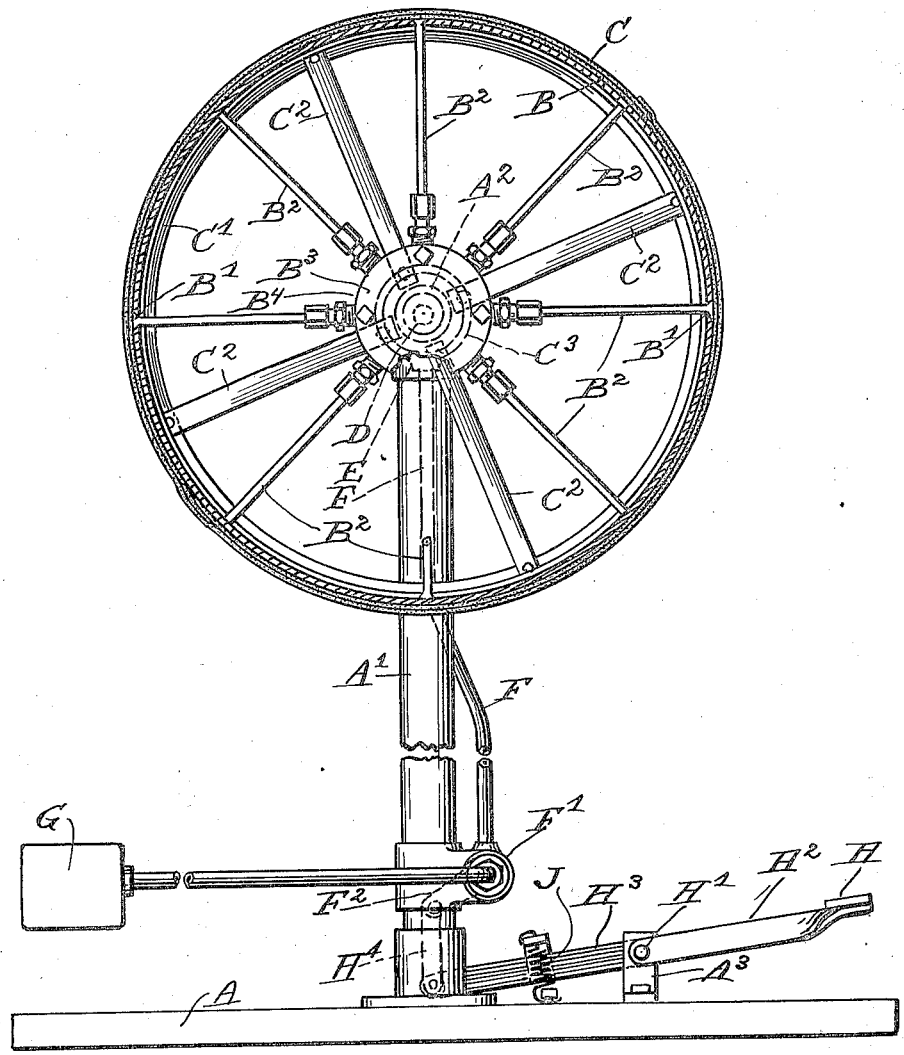
Fig. 2 is an end view of the machine shown in Fig. 1, looking from the left.

The band building machine shown in the drawings includes a base frame A on which there is mounted a suitable standard $A^1$ having fixedly secured at its upper end, a drum supporting hollow shaft $A^2$ horizontally arranged and located at a level convenient for the operator. Rotatably mounted on the shaft is a hollow drum B presenting an outer cylindrical surface on which the band C is formed, and carrying an internal ring $C^1$, spokes $C^2$ and hub $C^3$, all centrally located and by means of which the drum is supported on the horizontal shaft $A^2$. The drum is held on the shaft by a pin $C^4$, threaded through the hub $C^3$ and extending into and adapted to track along an annular groove $a$ formed in the hollow shaft near its end.

Figure 3:
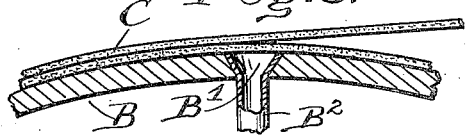
Fig. 3 is a sectional view through a portion of the drum, illustrating the manner in which the band is applied to the drum and the means by which the air is directed against the band.
Figure 4:
Fig. 4 is a view similar to Fig. 3, but illustrating the manner in which the air builds up in a thin film between the adjacent surfaces of the band and the drum.

In forming the band, the operator takes a strip of gum coated fabric either from a stock roll or from a bias cutter, applies the leading end thereof to the outer surface of the drum, and rotates the latter while pressing the fabric thereagainst (see Fig. 3) until the fabric meets or overlaps the leading end. The fabric is then cut, if need be, and the ends spliced. Usually a band consists of two plies of fabric, with the cords of the different plies crossing each other substantially at right angles.

In order now to remove the band C from the drum according to the method contemplated herein, air is projected in a series of jets against the inner surface of the band through holes or nozzles $B^1$ opening at the drum surface, and as these nozzles are located intermediate the ends of the band C as it lies on the drum, a slight pressure will be built up, breaking the adhesion between the band and the drum, and creating in effect a film of air between the two adjacent surfaces. The operator then merely slides the band longitudinally off the drum (see Fig. 5), at the end thereof opposite the standard $A^1$, since at such end there is nothing to interfere.

In the embodiment of the invention shown, the nozzles $B^1$ are eight in number, a group of four being located on each side of a plane passing through the drum center, those in each group being spaced 90° apart around the drum surface, but staggered with respect to those of the other group. Air is directed to the nozzles $B^1$ through individual tubes $B^2$ which at their outer ends are expanded into a truncated conical shaped seat in the drum, forming the nozzles just mentioned, and which at their inner ends converge at the center of the drum where they are connected each to a header $B^3$ common to all the air tubes. The header is arranged to rotate with the drum B and for this purpose is carried by the spokes $C^2$ to which it is rigidly secured by tap bolts passing through the spokes and threaded into lugs formed on the header. The header preferably is cylindrical in shape, the connections of the air tubes therewith being spaced around the cylindrical surface at angles of 45°, and is closed at its end opposite the hub $C^3$ with a removable plate $B^4$ to facilitate assembling of the parts.

Air is supplied to the header $B^3$ through a pipe D extending at one end into the header through an internal boss $B^5$ formed in the wall of the header adjacent the hub $C^3$ and in which the pipe is secured against turning by a set screw $b$. The pipe D extends through the hollow supporting shaft $A^2$, entering at its opposite end into a stationary header E fixedly mounted by means of a suitable bracket $e$ on the standard $A^1$.

As the pipe D rotates with the drum, by virtue of its fixed connection with the rotatable header $B^3$, the connection between it and the stationary header E is made air-tight by means of a packing joint which includes a packing member $E^1$ pressed tightly against a shoulder $E^2$ formed in a recess in the header, a bushing $E^3$ encircling the pipe and threaded into the recess just mentioned.

The stationary header E has a connection F with a suitable air source shown diagrammatically at G, and in order that the operator may at will control the flow of air to effect the removal of the band, there is provided a valve $F^1$ in the air connection, normally closed but which may be opened by the operator simply by depressing a foot treadle bar H conveniently located at the front of the machine, and which is operatively connected for operating the valve by means that includes a cross shaft $H^1$, journalled in bearings $A^3$ carried by the base frame A, a pair of fore-and-aft bars $H^2$ rigidly connecting the treadle bar with the shaft $H^1$, and a third fore-and-aft bar $H^3$ fixed to the shaft $H^1$ at the end thereof adjacent the valve and which at its rear end is connected to a valve operating handle $F^2$ with which the valve is equipped through a rigid intermediate link $H^4$.

According to the arrangement just described, the operator upon completing the band may effect its release from the drum, merely by depressing the foot treadle H, whereupon the valve $F^1$ will be opened against the tension of a spring J secured at one end to the bar $H^3$ and anchored at its other end in the base frame, thus allowing air from the source G to flow to the stationary header E, through the pipe D to the rotatable header $B^3$, and thence to the nozzles $B^1$ through the intermediate tube connections $B^2$. As the air impinges against the band, a thin film thereof will be formed, thus breaking the adhesion and releasing the band from the drum, whereupon the operator slides it off the end of the drum, as shown in Fig. 5. Thereafter, the air is cut off by releasing the foot treadle, which allows the valve to close under the influence of the spring J.

As shown in the drawings, the drum is somewhat wider than the band, but this is in order that it may be used to make bands for different size tires, the band herein illustrated being for a tire of the size 7.00″x16″.

Of course, it will be understood that the invention herein disclosed is not limited merely to the making of bands for use in the construction of tires, but indeed, could be applied to the removal of a built-up tire should the latter be made by the so-called band method wherein a cylindrical drum is employed. Then, too, the devices shown for introducing air through the surface of the drum are only by way of illustration, and many other devices suitable for the purpose could be designed.

In the accompanying drawings, the invention has been illustrated merely by way of example and in preferred form, and obviously many variations and modifications may be made therein which will still be comprised within its spirit. It is to be understood therefore, that the invention is not limited to any specific form or embodiment, except insofar as such limitations are specified in the appended claims.

Having thus described my invention, what I claim is:

1. The method of removing a band from a building drum with which the band is in direct contact, which includes forcing air between the band and drum in different regions of the band to break the adhesion therebetween, and concurrently sliding the band off the drum.

2. The method of removing from a building drum a band which in the course of construction adheres to the surface of the drum, which method includes breaking the adhesion between the drum and band surfaces substantially simultaneously over the entire area of contact by creating a film of air between the adjacent surfaces, and sliding the band off the drum on the air film thus created.

3. The method of removing from a building drum a band which in the course of construction adheres to the surface of the drum, which method includes projecting a plurality of jets of air against the inner surface of a band to break the adhesion between the drum and band surfaces, and sliding the band off the drum while the air jets are still effective.

4. Apparatus for building bands for use in tires including, in combination, a non-collapsible drum on which the band is built in direct contact therewith and from which it is removable endwise as built, and means for forcing air between the adjacent band and drum surfaces in regions intermediate the ends of the band to facilitate removal of the band from the drum.

5. Apparatus for building bands for use in tires including, in combination, a non-collapsible drum on which the band is built in direct contact therewith and from which it is removable endwise as built, and means for projecting a series of jets of air against the inner surface of the band.

6. Apparatus for building bands for use in tires including, in combination, a non-collapsible drum on which the band is built in direct contact therewith and from which it is removable endwise as built, openings in the drum surface located between the ends of the band, and means for forcing air through the openings and between the inner face of the band and the outer face of the drum to facilitate removal of the band from the drum.

7. Apparatus for building bands for use in tires including, in combination, a hollow cylindrical non-collapsible drum on which the band is built in direct contact therewith and from which it is removable endwise as built, a plurality of openings in the drum surface located in the region thereof which is in contact with the band, and means within the drum communicating with said openings and through which air may be forced between the inner face of the band and the outer face of the drum to facilitate the removal of the band from the drum.

8. Apparatus for building bands for use in tires including, in combination, a rotatable hollow cylindrical non-collapsible drum on which the band is built in direct contact therewith and from which it is removable endwise as built, a plurality of openings provided in the drum surface and located in the region thereof with which the band is in contact when on the drum, and means including connections within the drum whereby air may be forced through said openings and between the band and the drum surface to facilitate removal of the band from the drum.

9. Apparatus for building bands for use in tires including, in combination, a rotatable hollow band supporting drum, a plurality of openings provided in the drum surface and located in the region thereof with which the band is in contact when on the drum, a header located within the drum and connected with the individual openings, and means for supplying air under pressure to the header.

10. Apparatus according to claim 9, wherein the header is rotatable with the drum, and wherein means are provided passing through the drum mounting for supplying air to the header.

11. Apparatus according to claim 9, wherein the header is rotatable with the drum, and wherein there are provided a source of air and a continuous connection between said source and the rotatable header.

12. Apparatus according to claim 9, wherein the header is rotatable with the drum, and wherein there are provided a source of air, a continuous connection between said source and the rotatable header, and a valve in said connection operable at the will of the operator to permit air to pass from the source to the rotatable header.

HARRY P. SCHRANK.